United States Patent
Wolfer et al.

(10) Patent No.: US 10,793,977 B2
(45) Date of Patent: Oct. 6, 2020

(54) PRESSURE REGULATION IN A FLOCK FEED

(71) Applicant: Maschinenfabrik Rieter AG, Winterthur (CH)

(72) Inventors: Tobias Wolfer, Zürich (CH); Gerhard Gschliesser, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 196 days.

(21) Appl. No.: 16/003,158

(22) Filed: Jun. 8, 2018

(65) Prior Publication Data
US 2018/0355520 A1 Dec. 13, 2018

(30) Foreign Application Priority Data
Jun. 8, 2017 (CH) .......................... 742/17

(51) Int. Cl.
*D01G 23/04* (2006.01)
*B65G 11/20* (2006.01)
*D01G 23/06* (2006.01)
*D01G 23/08* (2006.01)

(52) U.S. Cl.
CPC ............ *D01G 23/04* (2013.01); *B65G 11/20* (2013.01); *D01G 23/06* (2013.01); *D01G 23/08* (2013.01)

(58) Field of Classification Search
CPC ........ D01G 23/00; D01G 23/02; D01G 23/04; D01G 23/045; D01G 23/06; D01G 23/08
See application file for complete search history.

(56) References Cited

U.S. PATENT DOCUMENTS

| | | | |
|---|---|---|---|
| 3,474,501 A | 10/1969 | Walter | |
| 3,744,092 A | 7/1973 | Auten | |
| 4,161,052 A * | 7/1979 | Erben | D01G 23/04 19/105 |
| 4,682,388 A * | 7/1987 | Pinto | D01G 23/04 19/105 |
| 4,731,909 A * | 3/1988 | Duda | D01G 23/04 19/105 |
| 4,776,066 A | 10/1988 | Leifeld | |
| 4,779,311 A | 10/1988 | Leifeld | |
| 5,002,102 A | 3/1991 | Hösel | |

(Continued)

FOREIGN PATENT DOCUMENTS

| | | |
|---|---|---|
| CH | 706658 A1 | 12/2013 |
| DE | 22 27 506 B | 12/1972 |

(Continued)

OTHER PUBLICATIONS

Machine Translation of EP2867392, retrieved Feb. 14, 2020.*
Swiss Search Report, dated Sep. 26, 2017.

*Primary Examiner* — Shaun R Hurley
(74) *Attorney, Agent, or Firm* — Dority & Manning, P.A.

(57) ABSTRACT

A device and method for regulating pressure in a flock feed include a storage device disposed for receipt of fiber flocks, an exhaust air fan having a drive, and a controller in communication with the drive. A filling level measurement device and a pressure measurement device are provided in the storage device. The controller is configured to regulate the drive to achieve a target pressure as sensed by the pressure measurement device that is based on a filling level of the fiber flocks determined by the filling level measurement device.

6 Claims, 1 Drawing Sheet

(56) References Cited

U.S. PATENT DOCUMENTS

| | | | | |
|---|---|---|---|---|
| 5,737,806 A | * | 4/1998 | Leifeld | .......... D01G 15/20 |
| | | | | 19/105 |
| 5,769,573 A | | 6/1998 | Faas et al. | |
| 6,185,787 B1 | * | 2/2001 | Waeber | .......... D01G 15/24 |
| | | | | 19/105 |

FOREIGN PATENT DOCUMENTS

| | | |
|---|---|---|
| DE | 36 17 526 A1 | 11/1987 |
| DE | 36 17 527 A1 | 11/1987 |
| DE | 36 21 009 A1 | 1/1988 |
| EP | 0 563 700 A1 | 10/1993 |

\* cited by examiner

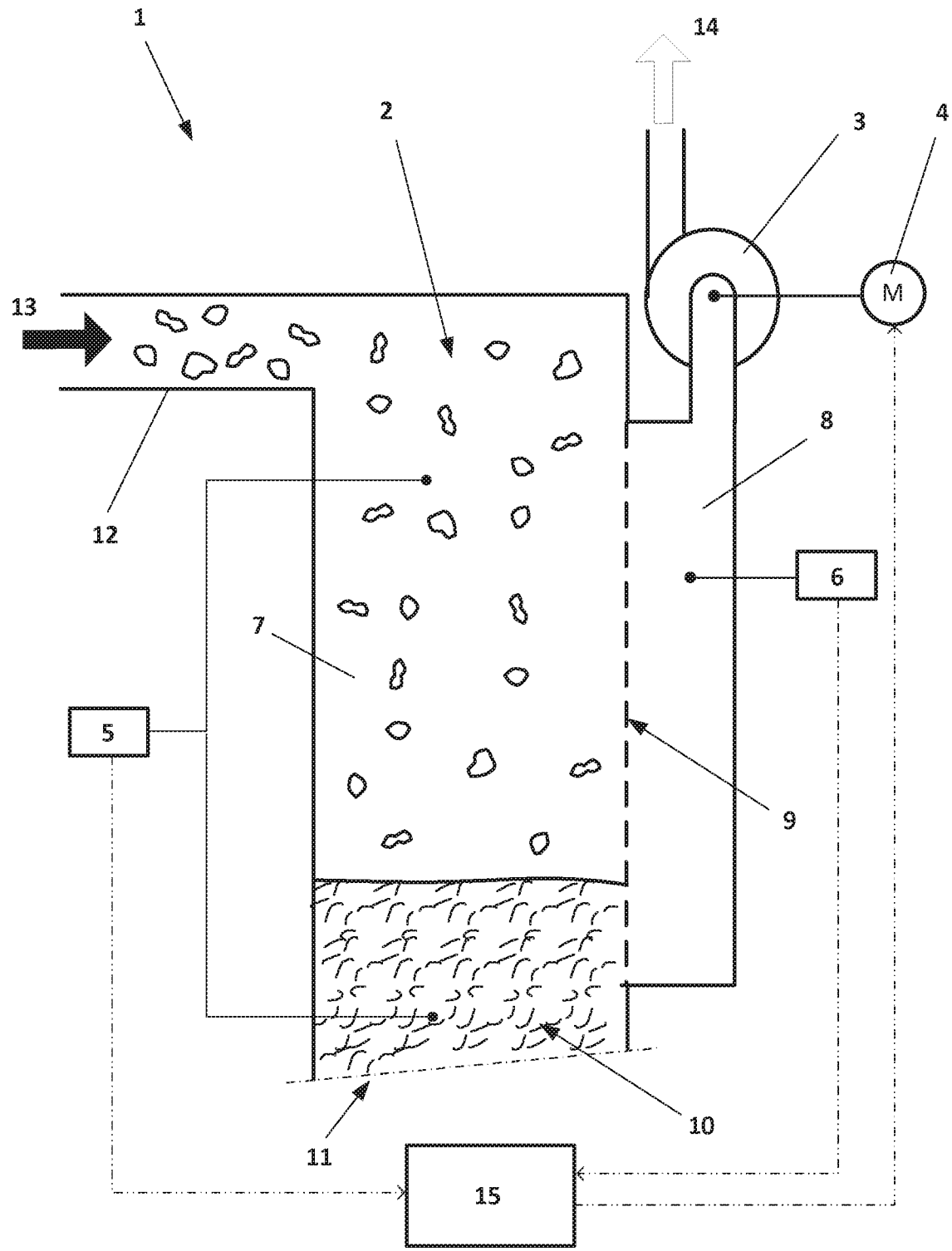

PRESSURE REGULATION IN A FLOCK FEED

FIELD OF THE INVENTION

The invention relates to a method and a device for regulating pressure in a flock feed of a fiber processing machine.

BACKGROUND

Fiber processing machines, such as temporary storage, mixers, or cards are used in spinning preparation and serve to clean, mix and break up the fiber material into individual fibers and to parallelize the fibers. These machines have in common the fact that they have a flock feed. The fiber material to be processed is supplied to the machines in the form of fiber flocks through a pneumatic conveyance. The machines are usually associated with a filling chute, to which fibers to be processed are supplied from an upstream machine through a conveyor system. The fibers are transported in the form of fiber flocks with a stream of air. The fiber flocks are introduced into the machine for processing from the filling chute. The uniformity of the layer of fiber flock emerging from the filling chute plays an important role with regard to the lifetime of the downstream working elements and the requirements of the quality of the product being processed. The uniformity of the product produced by the machine is also influenced by the uniformity of the fiber flock layer emerging from the filling chute. Another important technological variable in processing is the weight of the emerging fiber flock layer. The weight and the uniformity of the fiber flock layer emerging from the filling chute are influenced to a significant extent by the pressure conditions in the filling chute.

In the feeding device, the fiber flocks are in turn separated from the conveyor air and sent for processing. EP 0 563 700 A1 discloses a feeding device, in which a fiber chute is filled pneumatically with fiber flocks. One wall of the chute has perforations, through which the conveyor air can escape, leaving the fibers behind in the fiber chute. Downstream from the perforated wall, there is an air-collecting conduit, from which the air is conveyed further through an exhaust air conduit. A throttle valve is provided in the exhaust air conduit, its design making it possible to maintain a constant exhaust air pressure. One disadvantage here is that the pressure conditions in the filling chute are not determined solely by the pressure in the exhaust air conduit, and the weight of the fiber flocks themselves, leading to compaction of the fiber flocks in the lower area of the filling chute, is not taken into account. The fiber flocks are compacted due to the weight of the fiber flocks in the filling chute and due to the pressure induced by the conveyor air in the filling chute.

SUMMARY OF THE INVENTION

An object of the invention is thus to create a device for regulating pressure in a flock feed, which will permit uniform compaction of the fiber flocks in the storage device, regardless of the flock feed and the filling level in the storage device, so that the pressure on the fiber flocks at the lower boundary of the storage device remains constant. Additional objects and advantages of the invention will be set forth in part in the following description, or may be obvious from the description, or may be learned through practice of the invention.

To achieve the objects, a novel device and a respective method for regulating the pressure in a flock feed with a storage device are proposed. The storage device can be filled with fiber flocks and connected to an exhaust air fan with a drive, wherein a filling level measurement and a pressure measurement are provided in the storage device. A target value for the pressure is assigned to each filling level. A controller is provided for controlling the drive of the exhaust air fan to regulate the target value for the pressure in the storage device. With this device, it is possible to compensate for the increasing influence of the fiber flocks on compaction of the fiber flocks in a lower area of the storage device when the filling level increases due to a decline in air pressure.

The fiber flocks sit on a lower boundary in the storage device. This lower boundary is formed in various ways in different machines and may be in the form of a conveyor belt, a dosing device, or a pair of discharge rollers, for example. For the further processing operation, the compaction of the fiber flocks at this lower boundary of the storage device is the definitive factor. When there is a high filling level in the storage device, the fiber flocks are already compacted due to the column of material present at the lower boundary. The compaction and/or the weight force of the column of material depend(s) on the type of fiber material and the height of the column of material. Furthermore, there is a load due to the pressure prevailing above the column of material in the storage device.

The storage device advantageously has a filling chute and an exhaust air conduit, such that the filling chute and the exhaust air conduit are separated by an air-permeable wall, and the pressure measurement is set up in the exhaust air conduit. The fiber flocks introduced into the storage device through a feed conduit are separated from the conveyor air through the air-permeable wall and remain in the filling chute. The conveyor air is discharged from the exhaust air conduit by the fan. Because of the connection of the filling chute and the exhaust air conduit through the air-permeable wall, the same static pressure prevails in the filling chute as in the exhaust air conduit, such that the pressure drop across the air-permeable wall is negligible. Basically, the pressure measurement can be set up in the filling chute or in the exhaust air conduit, so that contamination of the pressure measurement by fibers is largely prevented due to the preferred arrangement of the pressure measurement in the exhaust air conduit, and a reliable measurement is achieved.

It is also advantageous if the filling level measurement is embodied as a continuous measurement. Various methods from the prior art, such as ultrasonic or capacitive methods, are known as continuous measurements. Then the target value for the pressure at each filling level can be determined by means of a simple conversion formula. However, it is also possible to determine the target values for the pressure in a table and to convert the filling level into increments. The pressure associated with a given filling level preferably increases continuously with a decline in filling level. The target value for the pressure is preferably determined in such a way that the pressure on the fiber flocks at the lower boundary of the storage device is constant. To do so, in determining the target values for the pressure, one should take into account the fact that the column of material of fiber flocks does not exert a uniformly increasing force on the fiber flocks at the lower boundary when there is an increase in the height of the column of material, because the density of the column of material decreases toward the top.

Different target values are preferably provided at the same filling level for different materials or mixtures of materials of fiber flocks. Since the various materials used have extremely different inherent weights, there is also a difference in compaction, based on the column of material, as a function of these weights. For example, polyester fibers are heavier than cotton fibers. The controller, which may also be integrated into the machine controller, advantageously has input means for input of the material of the fiber flocks to be processed. Keyboards, touchscreens, preselection keys or similar means may be provided as the input means. It is also conceivable for the selection of material to be transferred from a higher-level controller or a central control system to the pressure control unit in the flock feed.

A method for regulating pressure in a flock feed with a storage device for filling with fiber flocks and with an exhaust air fan with a drive are also proposed, wherein the filling level and the pressure in the storage device are measured. A target value for the pressure is determined with the measured filling level in a controller, and this target value for the pressure is regulated at a certain target level by the drive of the exhaust air fan in the storage device. The target value for the pressure in the storage device is determined in such a way that the pressure determined from the filling level decreases with an increase in filling level.

BRIEF DESCRIPTION OF THE FIGURE

The invention is explained in greater detail below on the basis of an exemplary embodiment and is illustrated further by FIG. 1, which is a side schematic view of a device in accordance with an embodiment of the invention.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic diagram of a flock feeding device 1. The fiber flocks 10 are sent to the feeding device 1 through a feed conduit 12 of a pneumatic conveyor 13 to the feeding device 1. The feeding device 1 comprises a storage device 2 and an exhaust air fan 3 with a drive 4. The storage device 2 is separated by an air-permeable wall 9 into a filling chute 7 and an exhaust air conduit 8. The fiber flocks 10 entering the storage device 2 are separated from the conveyor air through the air-permeable wall 9, wherein the conveyor air is drawn out of the exhaust air conduit 8 by the fan 3 and sent as exhaust air 14 for further use or discharged into the surroundings. A filling level measurement 5 designed as a continuous measurement device is installed in the filling chute 7. The prevailing filling level is transmitted to a controller 15. The controller 15 determines a target value for the pressure and the filling chute 7 corresponding to the filling level. The exhaust air conduit 8 is provided with a pressure measurement 6, which also transmits the prevailing value and/or an actual value for the pressure in the exhaust air conduit 8 to the controller 15. Based on the target value for the pressure in the exhaust air conduit 8, determined from the filling level in the filling chute 7, the drive 4 of the fan 3 is regulated by the controller 15, so that the measured actual value of the pressure corresponds to the target value.

Due to the fact that a high filling level in the filling chute 7, which exerts a greater pressure on the fiber flocks 10 at the lower boundary 11 of the filling chute 7, is balanced by a lower pressure accordingly above the fiber flocks in the filling chute 7, it is possible to achieve a constant fiber flock density at the lower boundary 11 of the filling chute 7, which is independent of the filling level of the storage device 2.

Modifications and variations can be made to the embodiments illustrated or described herein without departing from the scope and spirit of the invention as set forth in the appended claims.

LEGEND

1 Feeding device
2 Storage device
3 Fan
4 Drive for fan
5 Filling level measurement
6 Pressure measurement
7 Filling chute
8 Exhaust air conduit
9 Air-permeable wall
10 Fiber flocks
11 Lower boundary of the storage device
12 Feed conduit
13 Pneumatic conveyance
14 Exhaust air
15 Controller

The invention claimed is:

1. A device for regulating pressure in a flock feed, comprising:
   a storage device disposed for receipt of fiber flocks;
   an exhaust air fan having a drive;
   a controller in communication with the drive;
   a filling level measurement device and a pressure measurement device provided in the storage device;
   wherein the controller is configured to regulate the drive to achieve a target pressure as sensed by the pressure measurement device that is based on a filling level of the fiber flocks determined by the filling level measurement device;
   wherein the target pressure in the controller assigned to the filling level increases continuously with a decrease in the filling level; and
   wherein the controller regulates the drive to maintain a pressure on the fiber flocks at a lower boundary of the storage device constant.

2. The device according to claim 1, wherein the storage device comprises a filling chute and an exhaust air conduit, the filling chute and the exhaust air conduit separated by an air-permeable wall, and wherein the pressure measurement device is arranged in the exhaust air conduit.

3. The device according to claim 1, wherein the filling level measurement device generates a continuous measurement.

4. The device according to claim 1, wherein the target pressure in the controller assigned to the filling level is different for different materials or mixtures of materials of the fiber flocks at the same filling level.

5. The device according to claim 4, wherein the controller is configured for input of the type of material of the fiber flocks to be processed.

6. A method for regulating pressure in a flock feed that includes a storage device for filling with fiber flocks and an exhaust air fan with a drive, comprising:

measuring a filling level of the fiber flocks in the storage device;
measuring a pressure a pressure in the storage device;
determining a target value for the pressure in the storage device based the measured filling level;
regulating the pressure in the storage device to achieve the target value by controlling the drive of the exhaust air fan; and
wherein the target value for the pressure in the storage device decreases with an increase in the filling level of the fiber flocks in the storage device.

\* \* \* \* \*